United States Patent
Springer (12)

(10) Patent No.: US 6,394,738 B1
(45) Date of Patent: May 28, 2002

(54) AUTOMATIC OUTRIGGER FOR A VEHICLE

(75) Inventor: Scott L. Springer, Menomonie, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/495,766

(22) Filed: Feb. 1, 2000

(51) Int. Cl.[7] .............................................. B62D 49/08
(52) U.S. Cl. ........................ 414/673; 187/232; 280/755
(58) Field of Search ........................... 187/232; 280/755, 280/763.1; 414/673

(56) References Cited

U.S. PATENT DOCUMENTS

| | | | |
|---|---|---|---|
| 1,138,610 A | 5/1915 | Hartsough | |
| 1,231,531 A | 6/1917 | Shilling | |
| 1,373,655 A | 4/1921 | Daniel et al. | |
| 2,916,172 A | 12/1959 | Locke | 214/674 |
| 3,011,580 A | 12/1961 | Reid | 180/82.1 |
| 3,497,095 A | 2/1970 | Couberly | 214/674 |
| 3,804,435 A | 4/1974 | See et al. | 280/150 |
| 4,221,530 A | 9/1980 | Williams, IV et al. | 414/673 |
| 4,502,709 A | 3/1985 | Schaeff | 280/758 |
| 4,623,032 A | 11/1986 | Kemmer | 180/169 |
| 5,165,497 A | 11/1992 | Chi | 180/169 |
| 5,314,037 A | 5/1994 | Shaw et al. | 180/169 |
| 5,420,792 A | 5/1995 | Butsuen et al. | 364/426.04 |
| 5,447,363 A | 9/1995 | Fukamachi | 303/125 |
| 5,461,357 A | 10/1995 | Yoshioka et al. | 340/435 |
| 5,639,119 A | 6/1997 | Plate et al. | 280/754 |
| 5,839,758 A | 11/1998 | Finch et al. | 280/756 |
| 5,931,499 A | 8/1999 | Sutherland | 280/755 |

FOREIGN PATENT DOCUMENTS

| | | | |
|---|---|---|---|
| DE | 1 481 327 | 1/1969 | |
| FR | 2322769 | * 4/1977 | 280/755 |
| FR | 2 548 124 A1 | 1/1985 | |
| GB | 880308 | 10/1961 | |
| GB | 1058603 | * 2/1967 | 187/232 |
| JP | 416499 | * 1/1992 | 187/232 |
| SU | 1230910 A | 5/1986 | |

OTHER PUBLICATIONS

International Search Report corresponding to International Patent Application Ser. No. PCT/US01/03369, dated Jun. 7, 2001, 5 pages.

* cited by examiner

*Primary Examiner*—Steven A. Bratlie
(74) *Attorney, Agent, or Firm*—Marshall, Gerstein & Borun

(57) ABSTRACT

An outrigger to prevent a moving vehicle from overturning includes an arm that normally stays in a retracted, stored position that allows the vehicle freedom to travel, but then automatically extends to brace the vehicle in response to tilting to a predetermined limit. The arm has a pivotal or linear motion driven by virtue of its own weight or by spring force. A releasable latch holding the arm in the stored position automatically releases the arm in response to a mechanical or electrical tilt sensor that detects that the vehicle has tilted to the limit.

10 Claims, 5 Drawing Sheets

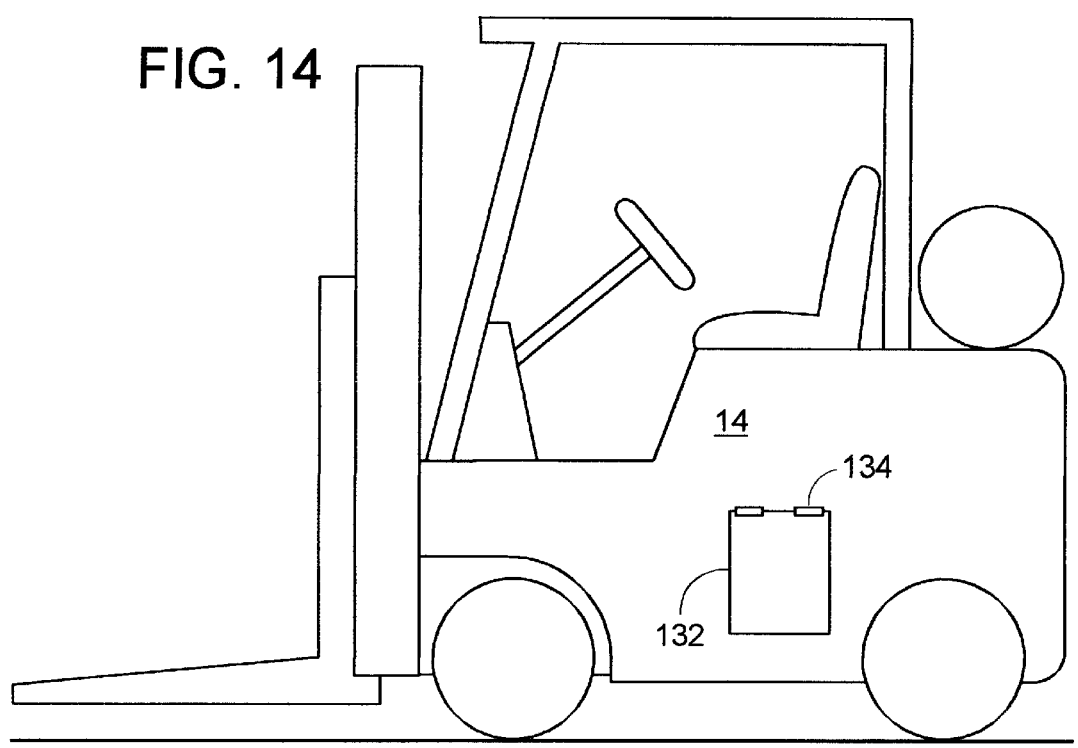
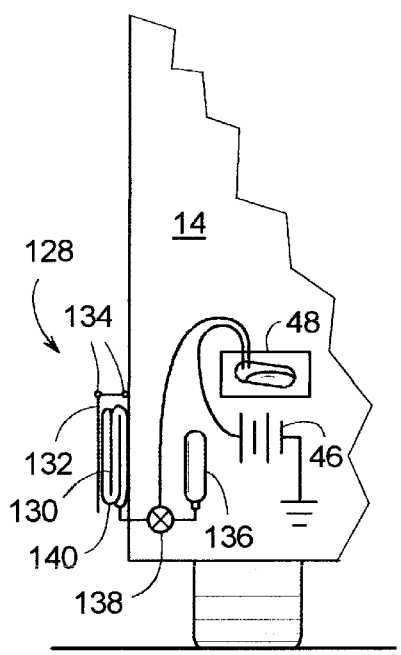
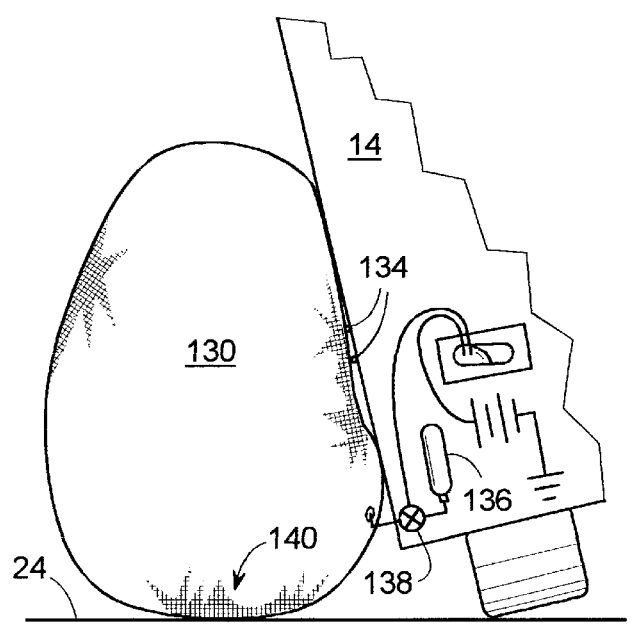

US 6,394,738 B1

AUTOMATIC OUTRIGGER FOR A VEHICLE

BACKGROUND OF THE INVENTION

1. Field of the Invention

The subject invention generally pertains to the prevention of a vehicle from overturning and more specifically to an outrigger for a vehicle.

2. Description of Related Art

Outriggers are often used to stabilize or prevent a parked vehicle from tilting. They are commonly found on service or construction vehicles that become generally top-heavy due to a crane mast or an extension ladder extending from the vehicle. When the vehicle parks to perform its service operation, the outrigger is extended sideways from the stationary vehicle and downward against the ground to widen the vehicle's base. When the service operation is complete, the outrigger is returned to a stored position, so as not to impede the vehicle's travel. Outriggers are usually moved manually or hydraulically between their stored and extended positions. Although such outriggers work well for parked vehicles, they are ineffective in preventing traveling vehicles from overturning.

Traveling vehicles can be caused to tip over for several reasons. For example, if the wheels on only the right or left side of the vehicle drive over an obstacle or void in the road or driving surface, that disruption could overturn the vehicle. An inclined driving surface would have a similar tipping effect upon a vehicle traversing the incline. Quick turns can also create a centrifugal force sufficient to overturn a vehicle. In the case of a forklift truck, raising a heavy load high overhead can make the forklift top-heavy and prone to tipping. To prevent a moving vehicle from tipping over, some vehicles include a ballast that moves automatically to shift the vehicle's center of gravity to counterbalance the tipping. Various types of moveable ballasts are disclosed in U. S. Pat. Nos. 2,916,172; 3,497,095; 4,221,530; and 4,502,709. Unfortunately, the weight of a moveable ballast has to be significant in comparison to the weight of the vehicle to be really effective. And a ballast of substantial weight can add unnecessary bulk and cost to a vehicle.

Minimizing bulk is especially important for vehicles, such as forklift trucks that need to maneuver within narrow aisles and between various obstacles that typically clutter shipping and receiving areas of a building. Shopping carts are another example of a vehicle that needs to travel within narrow aisles, and they tend to be top heavy and prone to tipping, especially when a child is in the cart. Lawn tractors often need to maneuver among trees and other obstacles, and are more prone to tipping when traversing inclined terrain. These are just a few examples of vehicles that could benefit from a compact anti-tipping device.

SUMMARY OF THE INVENTION

In order to provide a traveling vehicle with protection against overturning without adding unnecessary weight or bulk to the vehicle, an outrigger is provided that includes an engaging member that normally stays in a retracted, stored position, but then automatically extends to brace the vehicle in response to the vehicle tipping to a predetermined limit.

In some embodiments, a inclination sensor and a latch are combined into a single element that normally holds a spring-loaded arm in its retracted, stored position and then automatically releases the arm upon sensing the vehicle tipping to the predetermined limit.

In some embodiments a spring-loaded arm of an outrigger is unlatched by a solenoid actuator in response to an inclination responsive switch, such as a mercury switch.

Some embodiments include a mechanical inclination sensor that detects a vehicle tilting to a predetermined limit by contacting the surface upon which the vehicle is traveling.

In some embodiments, an outrigger comprises an inflatable bladder.

BRIEF DESCRIPTION OF THE DRAWINGS

FIG. 14 is a left side view of a forklift vehicle with an inflatable outrigger in its deflated stored position.

FIG. 15 is a rear view of the vehicle of FIG. 14.

FIG. 16 is the same as FIG. 15, but with the vehicle tilted and the outrigger in its deployed, inflated position.

DESCRIPTION OF THE PREFERRED EMBODIMENT

To prevent a vehicle from overturning, an outrigger 10 includes an engaging member such as arm 12 that by its own weight automatically swings between a stored position (FIG. 1) and a deployed position (FIG. 2), depending on the inclination of the vehicle to which it is mounted. The term, "vehicle" refers to any wheeled device capable of travel of which examples include, but are not limited to, a forklift truck 14, a shopping cart, a riding lawn mower/tractor and a wheelchair. The terms, "automatic" and "automatically" refer to an action initiated by a mechanical or electrical device as opposed to being initiated manually.

Figure 1:
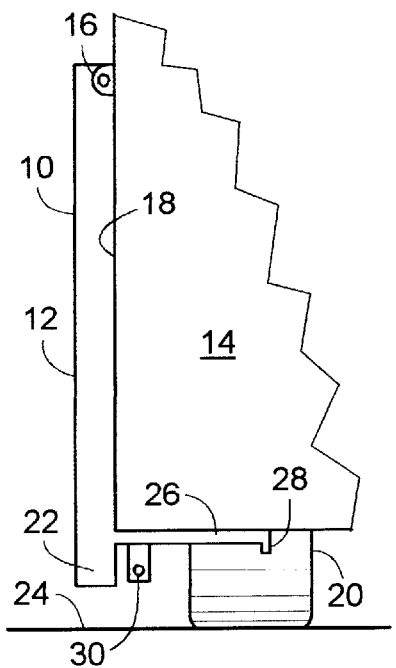
FIG. 1 is a partial rear end view of a vehicle, showing an outrigger attached to the left side of the vehicle, wherein the outrigger is in a stored position.
Figure 2:
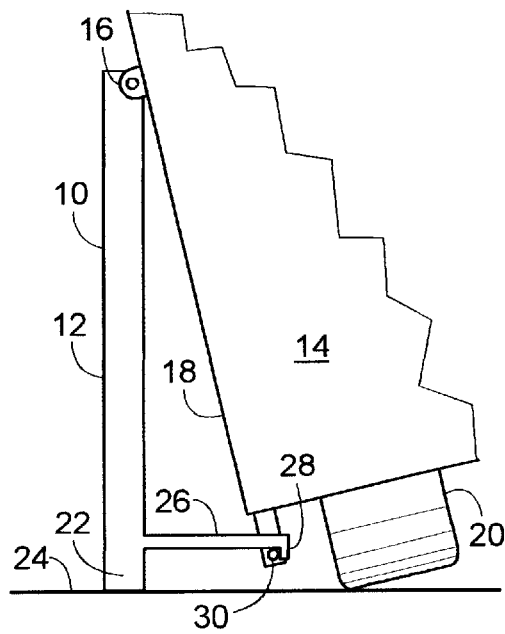
FIG. 2 is the same as FIG. 1, but with the vehicle tilted and the outrigger in a deployed position.

In one simple exemplary embodiment, a pinned bracket 16 pivotally attaches arm 12 to a side 18 of forklift 14. Under its own weight, arm 12 hangs generally vertically from bracket 16 along side 18 when forklift 14 is level, as shown in FIG. 1. In the event that forklift 14 tips sideways about its wheels 20 to a predetermined limit, as shown in FIG. 2, arm 12 continues to hang generally vertically to place a distal end 22 of arm 12 up against the ground or surface 24 upon which forklift 14 travels. This helps keep forklift 14 from tipping beyond the limit. Although outrigger 10 is shown only on the left side of forklift 14, in most cases similar or identical outriggers are installed on both sides of the vehicle.

To limit the extent to which arm 12 swings outward from vehicle 14, an optional brace 26 (e.g., a rigid elongated member as shown or a flexible one such as a chain, cable or cord) extending from arm 12 includes a catch 28 that engages a protruding stop pin 30 when arm 12 is in its deployed position. When brace 26 is relatively light, arm 12 tends to hang vertically as shown in FIG. 1. However, it is well within the scope of the invention to provide brace 26 with substantial weight to create a moment about pinned bracket 16 to urge arm 12 outward to its deployed position. In such a case, a releasable latch could be used to hold arm 12 in its stored position until vehicle 14 tips to the predetermined limit. At that point, the latch would move to release arm 12, so that the weight of brace 26 could quickly push arm 12 out to its deployed position. Various biasing elements can also be added to urge arm 12 outward. Examples of biasing elements include, but are not limited to mechanical springs; gas springs; such as bladders, diaphragms, and piston/cylinder; hydraulic piston/cylinder; electromechanical actuators; and weights. Also, the latches can assume a variety of forms, a few examples of which are described with reference to other embodiments of the invention.

Figure 3:
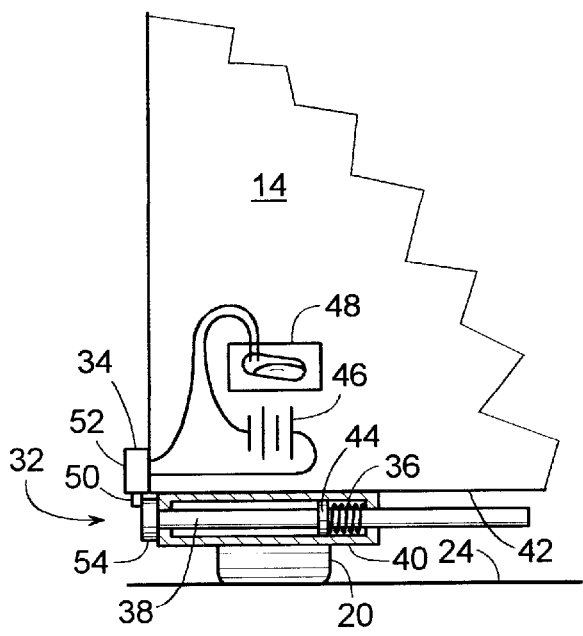
FIG. 3 is a partial rear end view of a vehicle showing a cross-sectional view of an outrigger of another embodiment.
Figure 4:
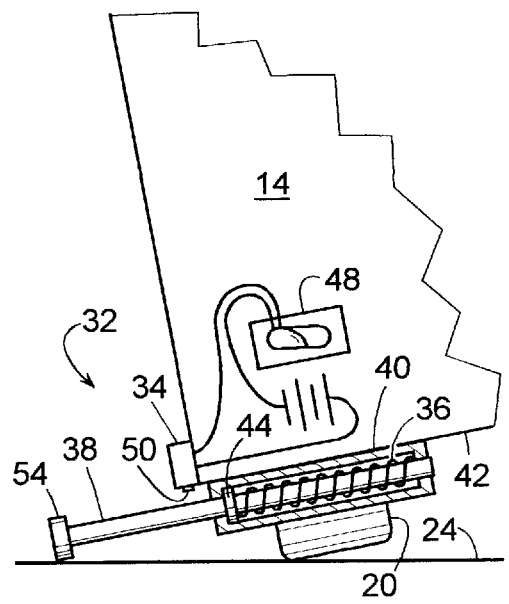
FIG. 4 is the same as FIG. 3, but with the vehicle tilted and the outrigger in a deployed position.

For example, an outrigger 32 (FIGS. 3 and 4) includes a latch 34 and a compression spring 36 that allow an extendible arm 38 to remain in a fully retracted stored position (FIG. 3) until vehicle 14 tips beyond a limit, at which point arm 38 rapidly moves to a deployed position (FIG. 4). Arm 38 slides linearly within a cylindrical housing 40 that is attached to a bottom portion 42 of forklift 14. Spring 36 serves a biasing element that urges arm 38 to extend by pushing up against a shoulder 44 of arm 38. Although latch could be mechanically actuated (i.e., non-electrical), in this example, it is solenoid actuated (i.e., electrically actuated). Solenoid actuated latch 34 is connected in series with a power source 46 (e.g., a battery) and a switch such as a normally open electrical switch 48 that changes state in response to forklift 14 tilting to the predetermined limit. In this case, normally open contacts are used; however, it is well within the scope of the invention to use normally closed contacts with an appropriate response mechanism. Switch 48 serves as a sensor that provides a reaction in response to vehicle 14 tipping beyond a limit, whereby the reaction is a change in the electrical continuity of switch 48. In this example, switch 48 is a conventional mercury switch; however, switch 48 is schematically illustrated to represent a variety of other switches responsive to a vehicle tipping. Solenoid 34 includes a normally extended plunger 50 that retracts into a housing 52 upon being energized.

In operation, plunger 50 is normally extended to engage a distal end 54 of arm 38 to hold arm 38 within housing 40 against the opposing force exerted by spring 36. When vehicle 14 tips far enough to close the electrical contacts of switch 48 (thereby energizing solenoid 34), plunger 50 retracts to release end 54, so spring 36 rapidly pushes arm 38 outward to its deployed position. In this example, distal end 54 is a roller that minimizes any frictional dragging force that may develop between it and surface 24 as forklift 14 continues to move forward while leaning against extended arm 38. Once forklift 14 rights itself, switch 34 can be forced closed (e.g., manually tilting the switch or shunting its contacts) to temporarily retract plunger 50 until arm 38 is manually pushed back to its stored position.

Figure 5:
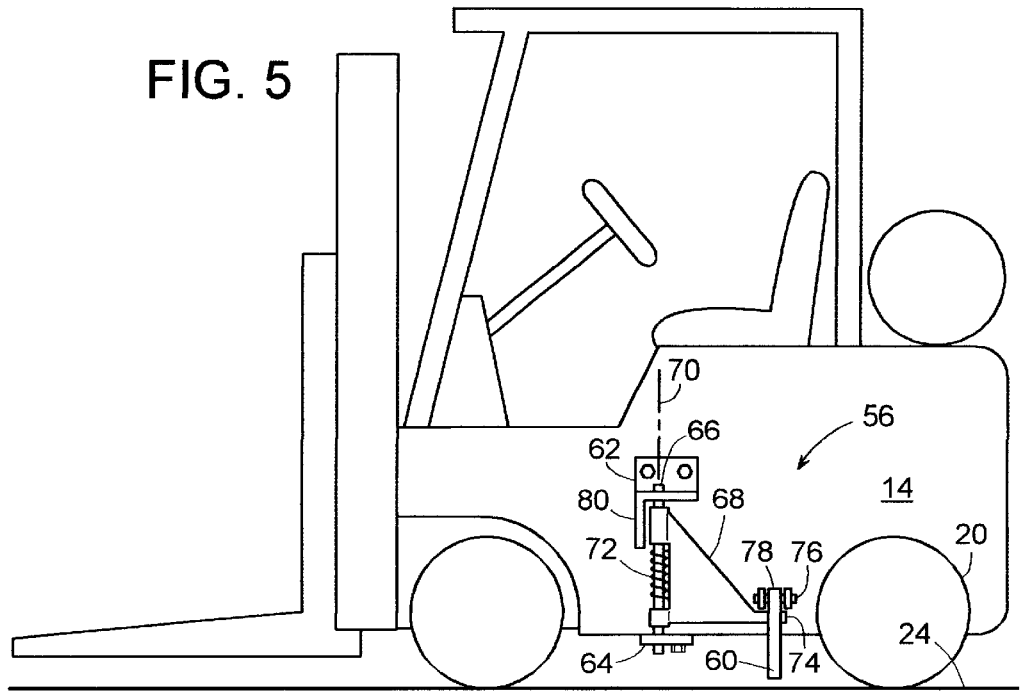
FIG. 5 is a left side view of a forklift vehicle with another embodiment of an outrigger attached to the left side of the vehicle, wherein the outrigger is in a stored position.
Figure 6:
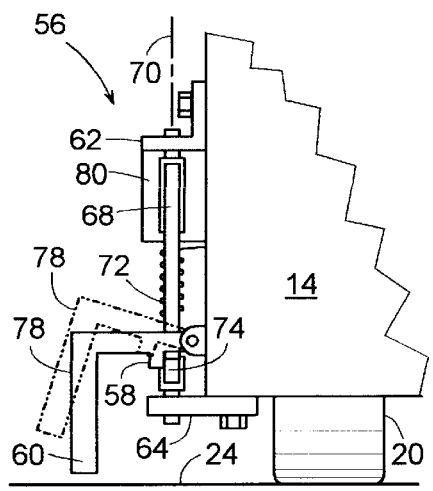
FIG. 6 is a partial rear end view of the vehicle of FIG. 5.
Figure 7:
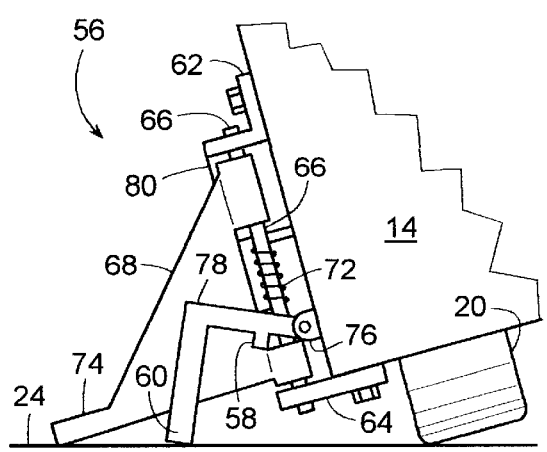
FIG. 7 is the same as FIG. 6, but with the vehicle tilted and the outrigger in a deployed position.

In FIGS. 5–7, an outrigger 56 combines a mechanical latch 58 with an inclination sensor having a mechanical trigger 60. In this embodiment, an upper bracket 62 and a lower bracket 64, attached to forklift 14, engages a shaft 66 to pivotally mount an arm 68 about an axis 70 having a vertical component (i.e., axis 70 is out of parallel with a horizontal plane). To assist in deploying distal end 74 of arm 68 from its stored position (FIGS. 5 and 6) to its deployed position (FIG. 7) a torsional spring 72, disposed about shaft 66, includes one end engaging arm 68 and an opposite end engaging forklift 14. A hinge 76 pivotally connects a member 78 to forklift 14. Member 78 includes latch 58 that releasably engages distal end 74 of arm 68 and includes trigger 60 that engages surface 24 to sense that vehicle 14 has tipped to its predetermined limit.

Under normal operation, member 78 pivots downward to a hold position where latch 58 holds end 74 at its stored position against the urging of spring 72, while trigger 60 is slightly (e.g., half inch) above surface 24, as shown in FIGS. 5 and 6. When forklift 14 tilts to a predetermined limit, as shown in FIG. 7, trigger 60 engaging surface 24 rotates member 78 upward (in relation to forklift 14, as shown in phantom in FIG. 6) to a release position where latch 58 releases end 74, which allows spring 72 to rapidly swing arm 68 outward to its deployed position. The downward extending portion of trigger 60 is sufficiently offset horizontally from the side of forklift 14 to allow clearance between the tip of end 74 and trigger 60 as arm 68 swings around. As arm 68 swings from its stored position, it engages a stop 80 that prevents arm 68 from rotating past its deployed position. Once in the deployed position, distal end 74 of arm 68 engages surface 24 to limit the tilting of forklift 14. The horizontal offset distance between trigger 60 and forklift 14, and the vertical ground clearance between the bottom of trigger 60 and surface 24 establishes the predetermined limit of tilting. Outrigger 56 is returned to normal operation by manually swinging arm 68 back to its stored position, and lowering member 78 so latch 58 engages end 74 to hold arm 68 in place.

Figure 8:
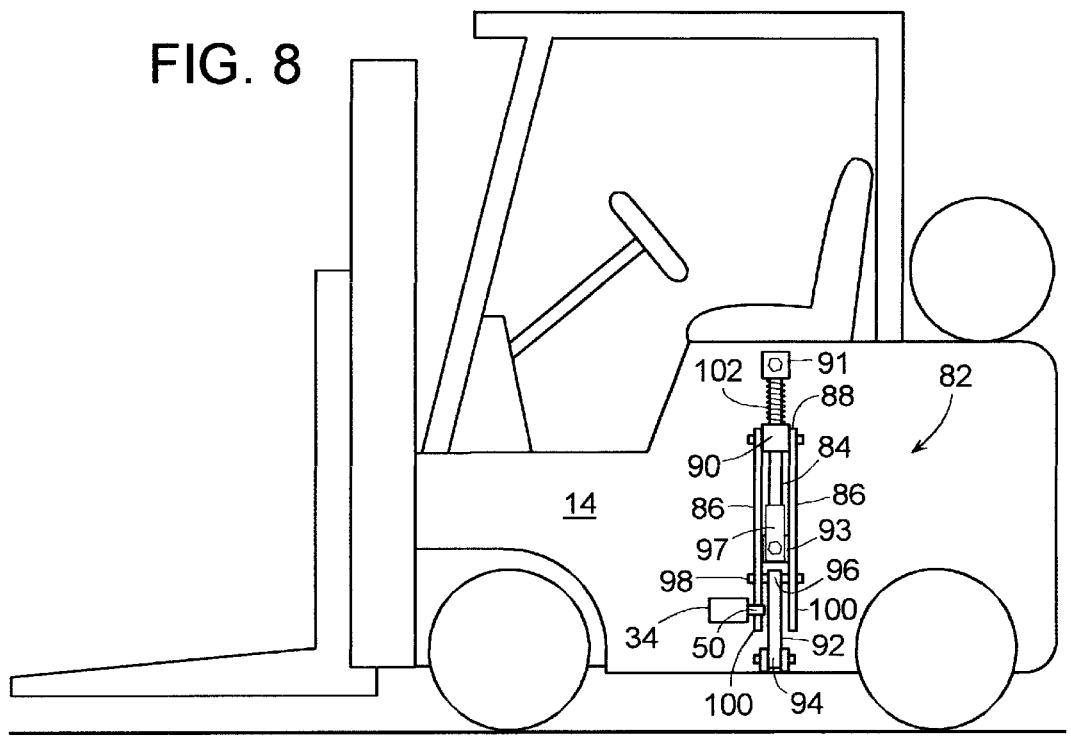
FIG. 8 is a left side view of a forklift vehicle with another embodiment of an outrigger attached to the left side of the vehicle, wherein the outrigger is in a stored position.
Figure 9:
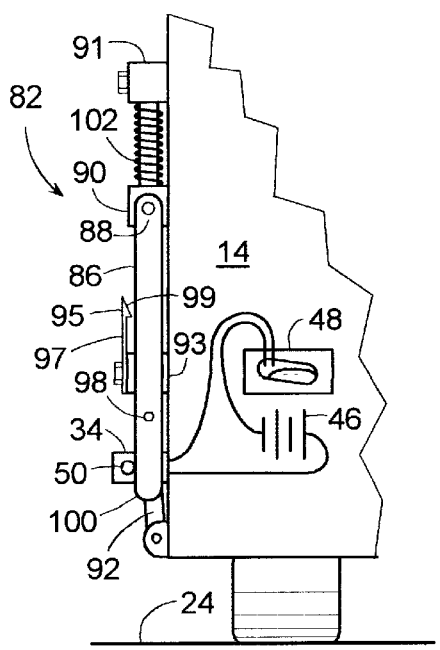
FIG. 9 is a partial rear end view of the vehicle of FIG. 8.
Figure 10:
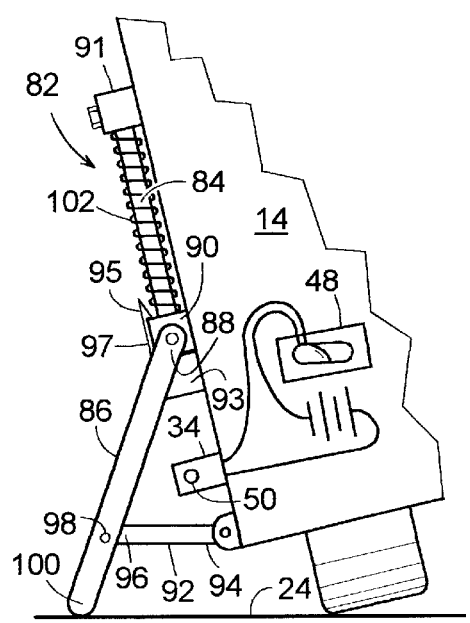
FIG. 10 is the same as FIG. 9, but with the vehicle tilted and the outrigger in a deployed position.

To provide greater ground clearance for travel, an outrigger 82 includes a vehicle-mounted track 84, as shown in FIGS. 8–10. Outrigger 82 includes an engaging member such as arm 86 having an upper end 88 pivotally attached to a carriage 90, which in turn is coupled for vertical translational movement along track 84. Track 84 is attached to forklift 14 by way of an upper bracket 91 and a lower bracket 93. A brace 92 having one end 94 pivotally attached to vehicle 14 has an opposite end 96 pivotally attached to arm 86 at an intermediate point 98 between upper end 88 and a lower distal end 100. A compression spring 102 disposed about track 84 and pushing carriage 90 downward urges outrigger 82 to its deployed position of FIG. 10.

In operation, normally extended plunger 50 of solenoid latch 34 holds distal end 100 in a stored position, as shown in FIGS. 8 and 9. When vehicle 14 tilts to the predetermined limit, power supply 46, through switch 48, energizes solenoid latch 34 to release end 100. Spring 102 then pushes carriage 90 down along track 84 to rapidly deploy arm 86, as brace 92 pivots about end 94 and point 98. Arm 86 in a deployed position is shown in FIG. 10. Once deployed, to prevent surface 24 from pushing arm 86 back up along track 84 as forklift 14 tilts, a catch 95 engages an upper edge of carriage 90. Catch 95 is cantilevered from lower bracket 93 by way of a flexible extension 97 (e.g., a spring-steel strap) and includes a tapered leading edge 99 that allows carriage 90 to slide downward into engagement with catch 95. Bending extension 97 outward to disengage catch 95 from carriage 90 allows outrigger 82 to be manually returned to its stored position in a manner similar to that described with reference to outrigger 32.

Figure 11:
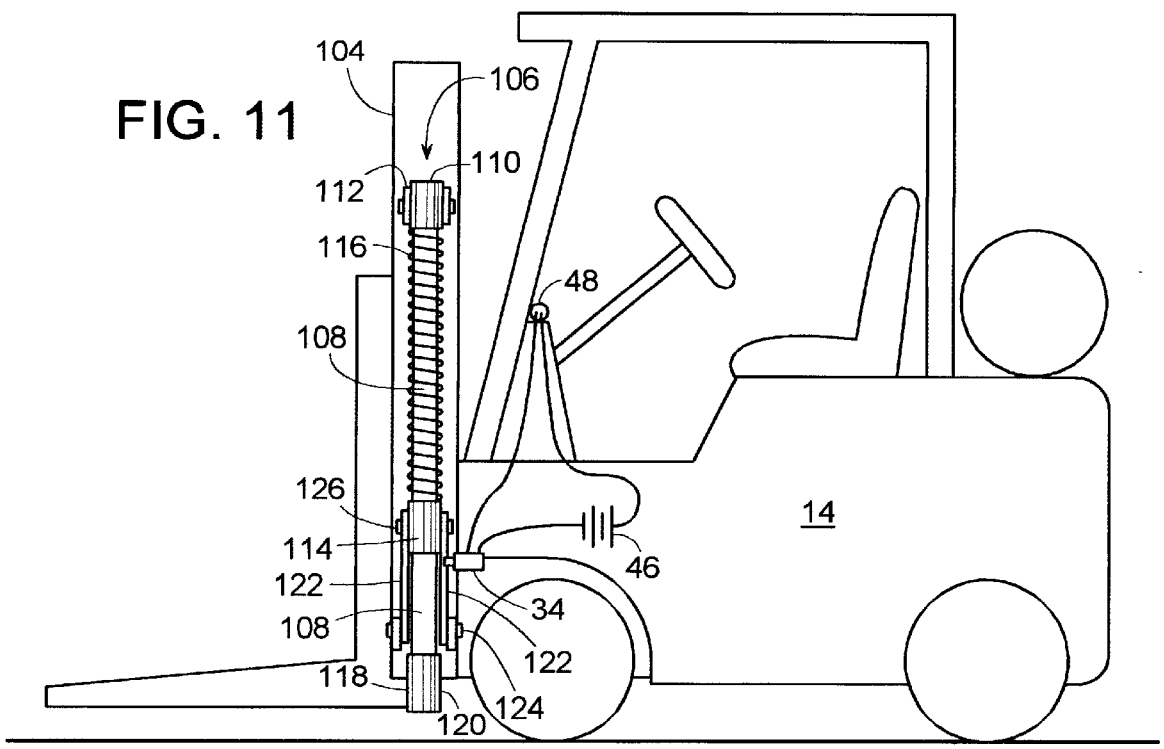
FIG. 11 is a left side view of a forklift vehicle with an outrigger attached to the left outer mast of the forklift, wherein the outrigger is in a stored position.
Figure 12:
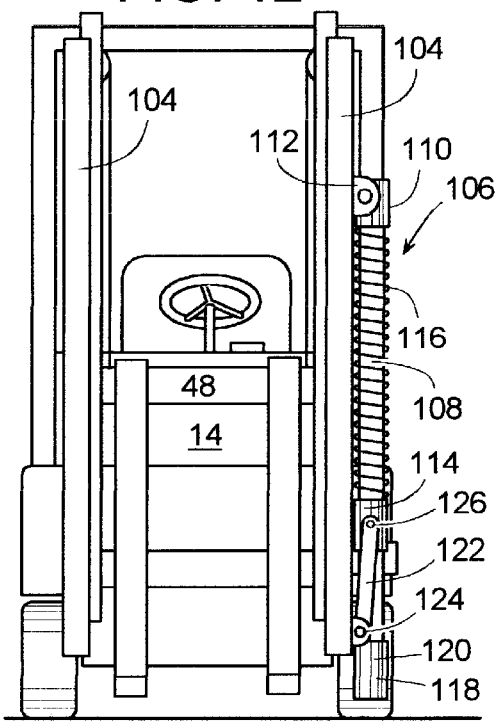
FIG. 12 is a front view of the vehicle of FIG. 11.
Figure 13:
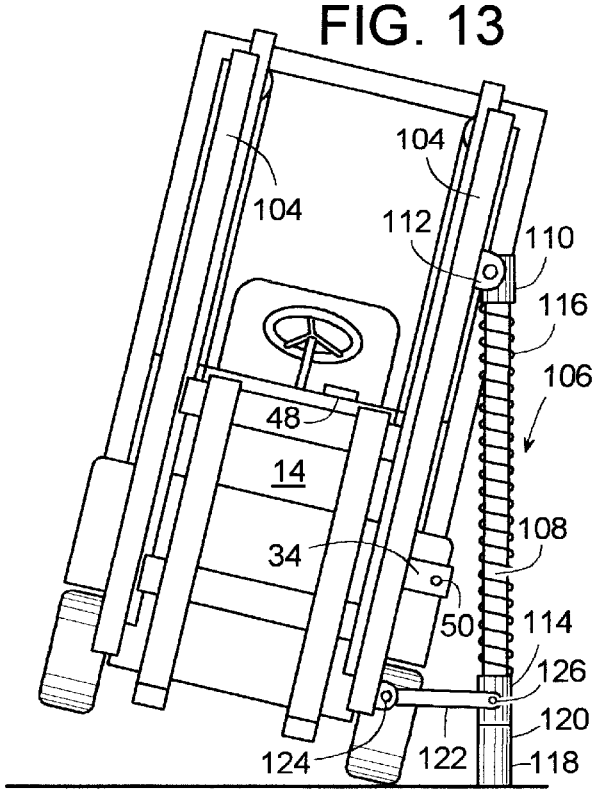
FIG. 13 is the same as FIG. 12, but with the vehicle tilted and the outrigger in a deployed position.

To provide vehicle 14 with more side clearance for maneuvering within narrow aisles, an outrigger can be mounted to an outer mast 104 of forklift 14, as shown in FIGS. 11–13. An outrigger 106, for example, includes an engaging member such as arm 108 with an upper end 110 attached to mast 104 by way of a pivotal bracket 112. Arm 108 serves as a guide track along which a carriage 114 can move. A compression spring 116 disposed about arm 108 urges carriage 114 downward to a distal end 118 where a stop 120 is installed to limit the downward travel of carriage 114. A dual-brace 122 pivotally attached to mast 104 at a point 124 and pivotally attached to carriage 114 at point 126 causes end 118 of arm 108 to alternately move towards and away from mast 104 as carriage 114 moves up and down respectively. Normally extended plunger 50 of solenoid latch 34 holds dual-brace 122 back, which holds distal end 118 in a stored position, as shown in FIGS. 11 and 12. When vehicle 14 tilts to the predetermined limit, power supply 46, through switch 48, energizes solenoid latch 34 to release dual-brace 122. Spring 116 then pushes carriage 114 down along arm 108 to rapidly deploy arm 108, as dual-brace 122 pivots about points 124 and 126. Arm 108 in a deployed position is shown in FIG. 13. Outrigger 106 is manually returned to its stored position in a manner similar to that described with reference to outrigger 32.

To provide an outrigger with rapid deployment and a minimum number of mechanical moving parts, outrigger 128 of FIGS. 11–13 includes an engaging member that comprises an inflatable bag 130. Bag 130 is similar to what is known as an "air bag" used for protecting occupants of an automobile in a collision. However, the size and strength of bag 130 are such that bag 130, when inflated, can inhibit forklift 14 from overturning by serving as a bolster between the side of forklift 14 and surface 24. Bag 130 is normally deflated and folded into a collapsed, stored position, as shown in FIG. 12. To protect the deflated bag, a cover 132 preferably extends over bag 130 and is hinged (e.g., hinges 134) or otherwise moveably attached to the side of forklift 14 to allow rapid, substantially unrestricted deployment of bag 130. To deploy or inflate bag 130, a pressurized, fluid-filled canister 136 is connected by way of a valve 138 to discharge a fluid (e.g., air, carbon dioxide, nitrogen, etc.) into bag 130. As bag 130 inflates, a distal end 140 of bag 130 engages surface 24, as shown in FIG. 13. Valve 138 is normally closed when forklift 14 is substantially upright, but then rapidly opens when forklift 14 tilts to a predetermined limit. In one embodiment, for example, a solenoid opens valve 138 in response to a circuit comprising power supply 46 and tilt switch 48 whose operation has already been explained with reference to other embodiments. It should be noted, however, that other schemes for rapidly opening a valve (electromechanical or mechanical) could also be used.

Although the invention is described with reference to a preferred embodiment, it should be appreciated by those skilled in the art that various modifications are well within the scope of the invention. For example, the various styles of latches, tilt sensors, and engaging members can be interchanged and combined to create a variety of outriggers that still accomplish the same purpose of inhibiting a moving vehicle from overturning. Therefore, the scope of the invention is to be determined by reference to the claims that follow.

I claim:
1. An outrigger for a vehicle adapted to travel over a surface, comprising:

a sensor having a mechanical trigger that produces a reaction in response to the vehicle tilting beyond a predetermined limit; and an engaging member adapted to be attached to the vehicle and having a distal end being moveable from a stored position to a deployed position in response to the reaction, wherein the distal end is adapted to engage the surface in the deployed position and is spaced from the surface in the stored position.

2. The outrigger of claim 1, further comprising a biasing element urging the distal end to the deployed position and a latch moveable between a hold position and a release position, wherein the latch in the hold position prevents the distal end from moving to the deployed position and in the release position allows the biasing element to move the distal end to the deployed position.

3. The outrigger of claim 1, further comprising a latch moveable between a hold position and a release position, wherein the latch in the hold position prevents the distal end from moving to the deployed position and in the release position allows the distal end to move the to the deployed position.

4. The outrigger of claim 3, wherein the latch is mechanically actuated.

5. The outrigger of claim 1, wherein the distal end moves between the stored position and the deployed position by virtue of the engaging member being rotatable about an axis having a vertical component.

6. An outrigger for a vehicle adapted to travel over a surface, comprising:

a sensor having a mechanical trigger producing a reaction in response to the mechanical trigger engaging the surface;

an engaging member adapted to be attached to the vehicle and having a distal end being moveable between a stored position and a deployed position, wherein the distal end is adapted to engage the surface in the deployed position and is spaced from the surface in the stored position;

a biasing element urging the distal end to the deployed position; and a latch moveable from a hold position to a release position in response to the reaction of the sensor, wherein the latch in the hold position prevents the distal end from moving to the deployed position and in the release position allows the biasing member to move the distal end to the deployed position.

7. The outrigger of claim 6, wherein the latch is mechanically actuated to move between the hold position and the release position.

8. A method of stabilizing a vehicle adapted to travel over a surface, comprising:

sensing a mechanical trigger engaging the surface; and extending an engaging member outward from the vehicle in response to sensing the mechanical trigger engaging the surface.

9. The method of claim 8, further comprising latching the engaging member in a retracted position when tipping of the vehicle is below the predetermined limit.

10. The method of claim 8, further comprising urging the engaging member to extend by way of a biasing element.

* * * * *